United States Patent
Fukuda et al.

(10) Patent No.: US 10,878,702 B2
(45) Date of Patent: Dec. 29, 2020

(54) DRIVING SUPPORT APPARATUS AND DRIVING SUPPORT METHOD

(71) Applicant: DENSO CORPORATION, Kariya (JP)

(72) Inventors: Shotaro Fukuda, Kariya (JP); Eiji Teramura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/738,494

(22) PCT Filed: Jun. 17, 2016

(86) PCT No.: PCT/JP2016/068038
§ 371 (c)(1),
(2) Date: Dec. 20, 2017

(87) PCT Pub. No.: WO2016/208500
PCT Pub. Date: Dec. 29, 2016

(65) Prior Publication Data
US 2018/0174467 A1    Jun. 21, 2018

(30) Foreign Application Priority Data

Jun. 26, 2015 (JP) ................................. 2015-128883

(51) Int. Cl.
*G08G 1/16* (2006.01)
*B60W 30/18* (2012.01)
(Continued)

(52) U.S. Cl.
CPC ....... *G08G 1/167* (2013.01); *B60W 30/18163* (2013.01); *B62D 15/025* (2013.01);
(Continued)

(58) Field of Classification Search
CPC ............. G08G 1/167; B60W 30/18163; B62D 15/025; G05D 1/0231
See application file for complete search history.

(56) References Cited

U.S. PATENT DOCUMENTS

| | | | | |
|---|---|---|---|---|
| 8,798,841 B1 * | 8/2014 | Nickolaou | ......... | B62D 15/0265 701/23 |
| 2004/0262063 A1 * | 12/2004 | Kaufmann | ............. | B62D 1/286 180/169 |

(Continued)

FOREIGN PATENT DOCUMENTS

| | | |
|---|---|---|
| JP | 2006-193082 A | 7/2006 |
| JP | 2009-230464 | 10/2009 |

(Continued)

OTHER PUBLICATIONS

JP-2011113511-A (Year: 2011).*

*Primary Examiner* — Geepy Pe
*Assistant Examiner* — Bakari Underwood
(74) *Attorney, Agent, or Firm* — Maschoff Brennan

(57) ABSTRACT

A driving support apparatus includes a rear vehicle detection section that detects an adjacent rearward vehicle that is a vehicle traveling behind the own vehicle in an adjacent lane adjacent to the own vehicle lane. The driving support apparatus includes a control unit that acquires rear vehicle information relating to a rear vehicle traveling behind the own vehicle, on the same vehicle lane as the own vehicle. The control unit acquires boundary line information that expresses the position of a boundary line that divides the own vehicle lane and the adjacent lane. The control unit causes the own vehicle to travel so as to approach the boundary line, based on the boundary line information, when a rear vehicle is detected based on the rear vehicle information.

13 Claims, 5 Drawing Sheets

(51) Int. Cl.
*B62D 15/02* (2006.01)
*G05D 1/02* (2020.01)
*G06K 9/00* (2006.01)

(52) U.S. Cl.
CPC ....... *G05D 1/0231* (2013.01); *G06K 9/00798* (2013.01); *G06K 9/00805* (2013.01); *G05D 2201/0213* (2013.01)

(56) References Cited

U.S. PATENT DOCUMENTS

| | | |
|---|---|---|
| 2006/0161331 A1 | 7/2006 | Kumon et al. |
| 2008/0252482 A1* | 10/2008 | Stopczynski ........... G01S 13/87 340/903 |
| 2009/0024279 A1* | 1/2009 | Takeda ................... B62D 5/006 701/41 |
| 2012/0296522 A1 | 11/2012 | Otuka |
| 2013/0030691 A1 | 1/2013 | Sumizawa et al. |
| 2013/0057397 A1 | 3/2013 | Cutler et al. |
| 2018/0244153 A1* | 8/2018 | Ejiri ....................... G08G 1/167 |

FOREIGN PATENT DOCUMENTS

| | | | | |
|---|---|---|---|---|
| JP | 2011113511 A | * | 6/2011 | ............ G08G 1/163 |
| JP | 2012-133446 | | 7/2012 | |
| JP | 2014-180986 | | 9/2014 | |
| JP | 2015-60300 | | 3/2015 | |

\* cited by examiner

DRIVING SUPPORT APPARATUS AND DRIVING SUPPORT METHOD

CROSS-REFERENCE TO RELATED APPLICATION

This application is based on and claims the benefit of priority from earlier Japanese Patent Application No. 2015-128883 filed on Jun. 26, 2015, the description of which is incorporated herein by reference.

TECHNICAL FIELD

The present disclosure relates to technology for supporting driving of a vehicle.

BACKGROUND ART

Technology for supporting driving of a vehicle is known. In this technology, steering of the own vehicle is controlled based on the surrounding conditions and the travel conditions of the own vehicle. According to the technique described in PTL 1, in steering control for causing the own vehicle to follow a preceding vehicle, if the forward field of view of the own vehicle becomes obstructed by the preceding vehicle, the lateral position of the own vehicle is changed to secure the forward field of view of the driver.

CITATION LIST

Patent Literature

[PTL 1] JP 2006-193082 A

SUMMARY OF THE INVENTION

Technical Problem

When the surrounding conditions of the own vehicle are required to be recognized in a rearward direction as in the case of changing lane, for example, it is necessary for the vehicle driver to visually recognize the area in the rearward direction. In addition to the driver's visual recognition, the own vehicle is desirably equipped with detection means to detect the surrounding conditions of the own vehicle in the rearward direction. However, if there is a vehicle traveling behind the own vehicle (referred hereinafter as a rear vehicle) in the same lane as the own vehicle, the detection range of the detection means will be obstructed by the rear vehicle. Hence, for example, there is a risk of failing to detect a vehicle positioned further rearward than the rear vehicle in an adjacent lane that is the lane change destination (referred hereinafter as an adjacent rearward vehicle).

It is an object of the present disclosure to provide a technology for preventing failure in detecting an adjacent rearward vehicle positioned further rearward than the rear vehicle, in an adjacent lane, when there is a rear vehicle behind the own vehicle.

Solution to Problem

A driving support apparatus according to one aspect of the present disclosure includes rear vehicle information acquisition means, rearward vehicle detection means, boundary line information acquisition means, and boundary travel control means. The rear vehicle information acquisition means obtains rear vehicle information relating to a rear vehicle traveling behind the own vehicle in the same lane and in the traveling direction of the own vehicle. The rearward vehicle detection means detects an adjacent rearward vehicle traveling behind the own vehicle in an adjacent lane that is adjacent to the own vehicle lane. The boundary line information acquisition means obtains boundary line information expressing the position of a boundary line that divides the own vehicle lane and the adjacent lane. The boundary travel control means causes the own vehicle to approach and travel close to the boundary line, based on the boundary line information, when a rear vehicle is detected based on the rear vehicle information.

In this way, with the driving support apparatus according to the present disclosure, even if a part of the detection range of the rearward vehicle detection means is obstructed by the rear vehicle, obstruction of the detection range by the rear vehicle is reduced by causing the own vehicle to approach and travel close to the boundary line. In this way, when there is the rear vehicle traveling behind the own vehicle, the driving support apparatus according to the present disclosure prevents detection failures in detecting an adjacent rearward vehicle which is located further rearward than the rear vehicle, in an adjacent lane.

The signs shown in parentheses in the claims indicate a relationship to basic means specified in embodiments described hereinafter, and do not limit the technical scope of the present disclosure.

DESCRIPTION OF EMBODIMENTS

Embodiments using the technology of the present disclosure will be described below based on the drawings.

[1. Configuration]

Figure 1:
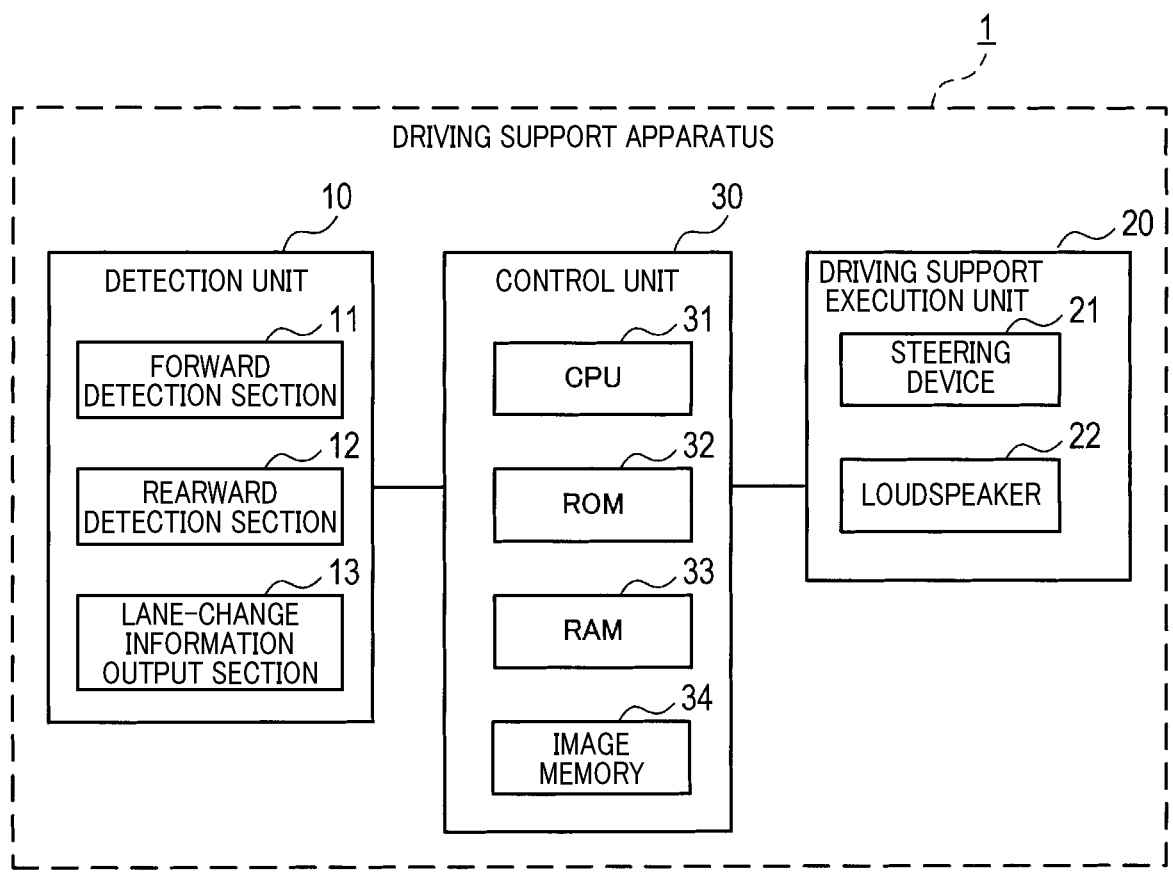
FIG. 1 is a block diagram showing a configuration of a driving support apparatus.

FIG. 1 shows a driving support apparatus 1 installed on a vehicle to execute driving support when the vehicle in which the driving support apparatus 1 is installed (referred to below as the own vehicle) is traveling on a road having a plurality of lanes. The driving support apparatus 1 provides driving support, for example, when the own vehicle performs a driving operation to change a lane from the own vehicle lane in which the own vehicle is currently traveling, to an adjacent lane which is adjacent to the own vehicle lane. The driving support apparatus 1 includes a detection unit 10, a driving support execution unit 20 and a control unit 30.

As an example, the detection unit 10 includes a forward detection section 11, a rearward detection section 12 and a lane-change information output section 13.

The forward detection section 11 detects at least a boundary line that divides the own vehicle lane and the adjacent lane, in the forward direction in which the own vehicle travels. With the present embodiment, the forward detection section 11 detects whether there is a vehicle traveling ahead of the own vehicle, in addition to the detection of the boundary line.

Specifically, the forward detection section 11 is equipped with a camera which is arranged at a front part of the own vehicle, so as to capture images of the boundary line in the forward direction in which the own vehicle travels. The forward detection section 11 obtains images, repetitively captured by the camera, of the area ahead of the own vehicle and of the road surface ahead of the own vehicle, including the boundary line, and outputs forward-captured image data to the control unit 30, where the forward-captured image data express the images repetitively captured by the camera.

The rearward detection section 12 detects a rear vehicle and an adjacent rearward vehicle that are behind the own vehicle in a traveling direction. A rear vehicle refers to a vehicle that is traveling behind the own vehicle in the same lane as the own vehicle, while the adjacent rearward vehicle refers to a vehicle that is traveling behind the own vehicle in an adjacent lane.

Specifically, the rearward detection section 12 is equipped with a camera, as with the forward detection section 11, and the camera is arranged at the rear end of the own vehicle so as to be capable of capturing images of rear vehicles and of adjacent rearward vehicles. The rearward detection section 12 outputs to the control unit 30 the rearward-captured image data which express the images in the rearward direction of the own vehicle repetitively captured by the camera.

The lane-change information output section 13 outputs lane change information. The lane change information expresses whether the own vehicle is required to execute a lane change. Although not shown, the lane-change information output section 13 includes, for example, direction indicators consisting of a right-side direction indicator and a left-side direction indicator, that are respectively disposed on the right side and on the left side of the own vehicle.

For example, when the driver of the own vehicle operates the right-side direction indicator or the left-side direction indicator, when a lane change is to be performed, the right- or left-side direction indicator outputs a signal showing that the operation has been performed by the driver. On the other hand, when such an operation is not performed by the driver of the own vehicle, a signal is outputted which indicates that no operation is performed by the driver. The lane-change information output section 13 outputs these signals outputted from the right- and left-side direction indicators to the control unit 30, as lane change information.

The driving support execution unit 20 is equipped with devices (control devices) for controlling control objects of the body system, power train system, chassis system, and the like, of the own vehicle. Examples of the control objects include a steering device 21 or a loudspeaker 22. Other control devices may be provided, including a braking device such as a brake, a drive device such an accelerator, a display, an engine, and the like, which are not shown. Moreover, each of the devices (control devices) that constitute the driving support execution unit 20 controls the behavior of control objects according to the traveling conditions of the own vehicle, and according to commands from the control unit 30. In that way, the driving support execution unit 20 performs known vehicle control, including steering control, engine control, and various types of warning control, such as speed warning, collision warning, and inter-vehicle warning. Each of the devices that constitute the driving support execution unit 20 detects the states of the control objects, and outputs the detection results to the control unit 30.

The control unit 30 is equipped with a known type of microcomputer, having a CPU 31, memory (for example, a ROM 32, a RAM 33, and an image memory 34), etc. The image memory 34 stores the image data. The CPU 31 executes a program stored in a recording medium, such as the ROM 32, and controls the driving support apparatus 1 by performing various types of processing according to the program. Specifically, the control unit 30 executes processing for outputting a command to realize the aforementioned various types of vehicle control. Furthermore, in parallel with this processing, the control unit 30 executes lane change processing, described below.

[2. Processing]

Figure 3:
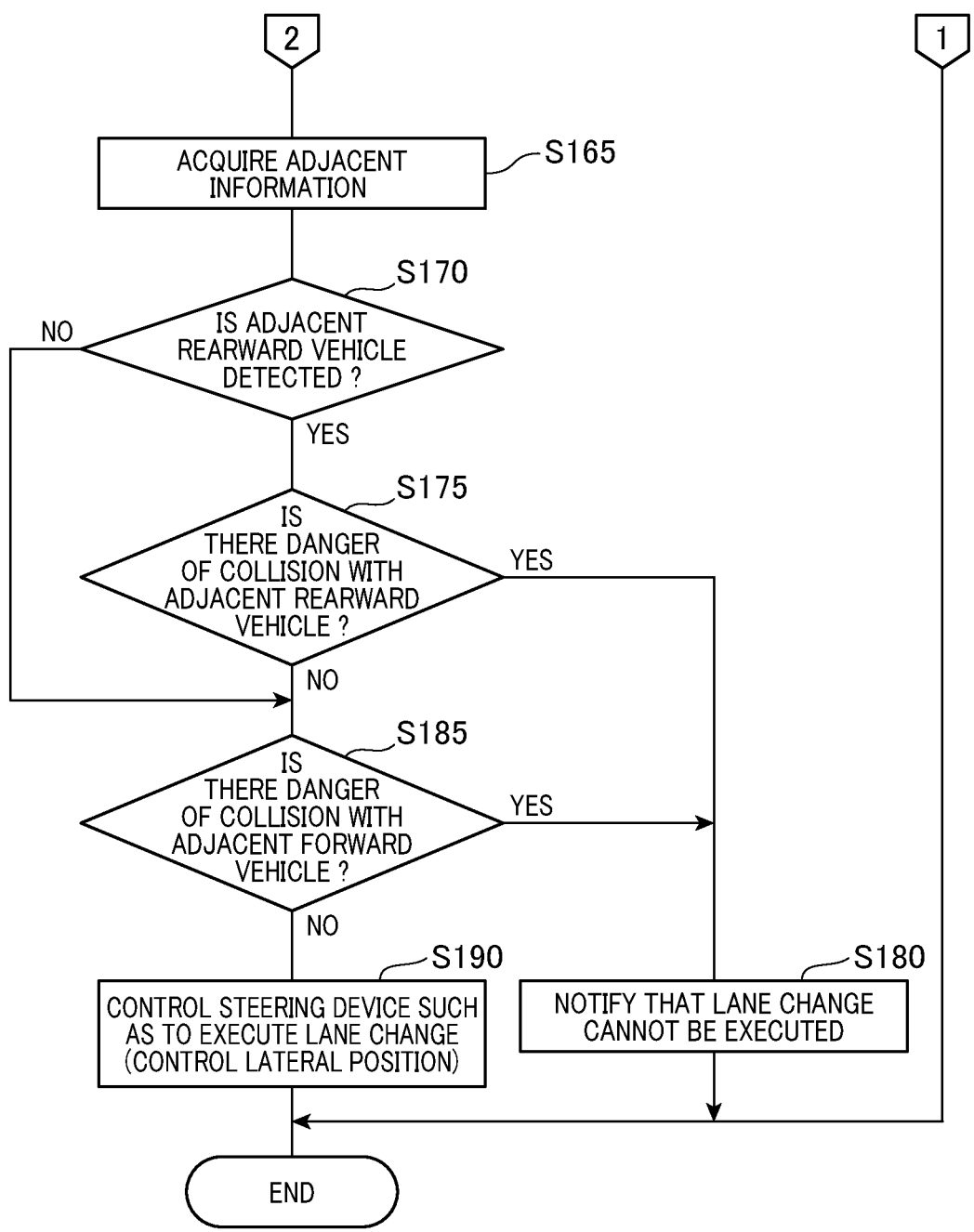
FIG. 3 is a flowchart (2/2) showing an example of lane change processing.
Figure 4:
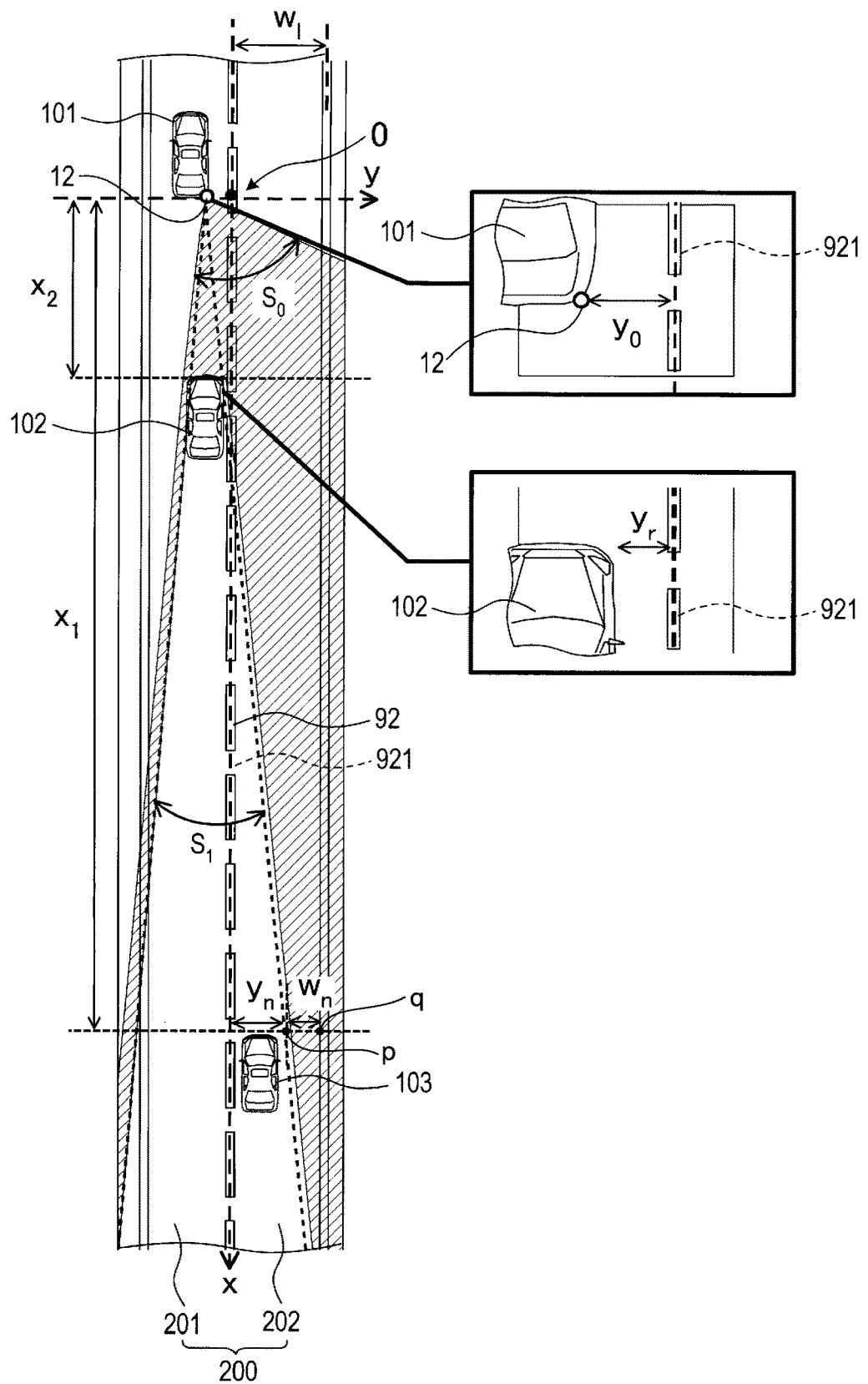
FIG. 4 is a diagram describing a non-detection condition.

Next, referring to the flowchart of FIGS. 2 and 3 and the diagram of FIG. 4, the lane change processing executed by the control unit 30 (CPU 31) of the driving support apparatus 1 will be described. As shown in FIG. 4, for example, the lane change processing is executed when the own vehicle 101 is traveling on a road 200 having a plurality of lanes 201, 202 to enable the own vehicle 101 to safely perform a lane change. The lane change processing is cyclically performed while the ACC switch of the own vehicle 101 is in an ON state.

As shown in FIG. 4, with the present embodiment, the following case is assumed, as an example at the time of a lane change. Specifically, it is assumed that, in the road 200 with two lanes in each direction, the own vehicle 101 makes a lane change from the own vehicle lane 201 to the adjacent lane 202 (the lane located at the right side of the own vehicle lane 201, with respect to the traveling direction of the own vehicle 101). Furthermore, as shown in FIG. 4, the rear vehicle 102 is present in the own vehicle lane 201 and is traveling behind the own vehicle 101, and the adjacent rearward vehicle 103 is present in the adjacent lane 202 and is traveling behind the own vehicle 101. In the following description, "the left side with respect to the traveling direction of the own vehicle 101" is referred to simply as "left side", and "the right side with respect to the traveling direction of the own vehicle 101" is referred to simply as "right side", for the sake of convenience. The boundary line 92 defines the two lanes of the road 200 (separation line between the own vehicle lane 201 and the adjacent lane 202), and is indicated in FIG. 4 as a broken white line.

Furthermore, with the present embodiment, the following type of control is assumed to be applied to the own vehicle 101 by the control unit 30 (CPU 31). Specifically, the own vehicle 101, in principle is permitted to travel close to the center of the own vehicle lane 201, as a reference position, according to the command outputted from the control unit 30 to the steering device 21.

In the following flowchart description, if the specific apparatus is not specified, it should be assumed that the steps are executed by the control unit 30 (CPU 31).

Figure 2:
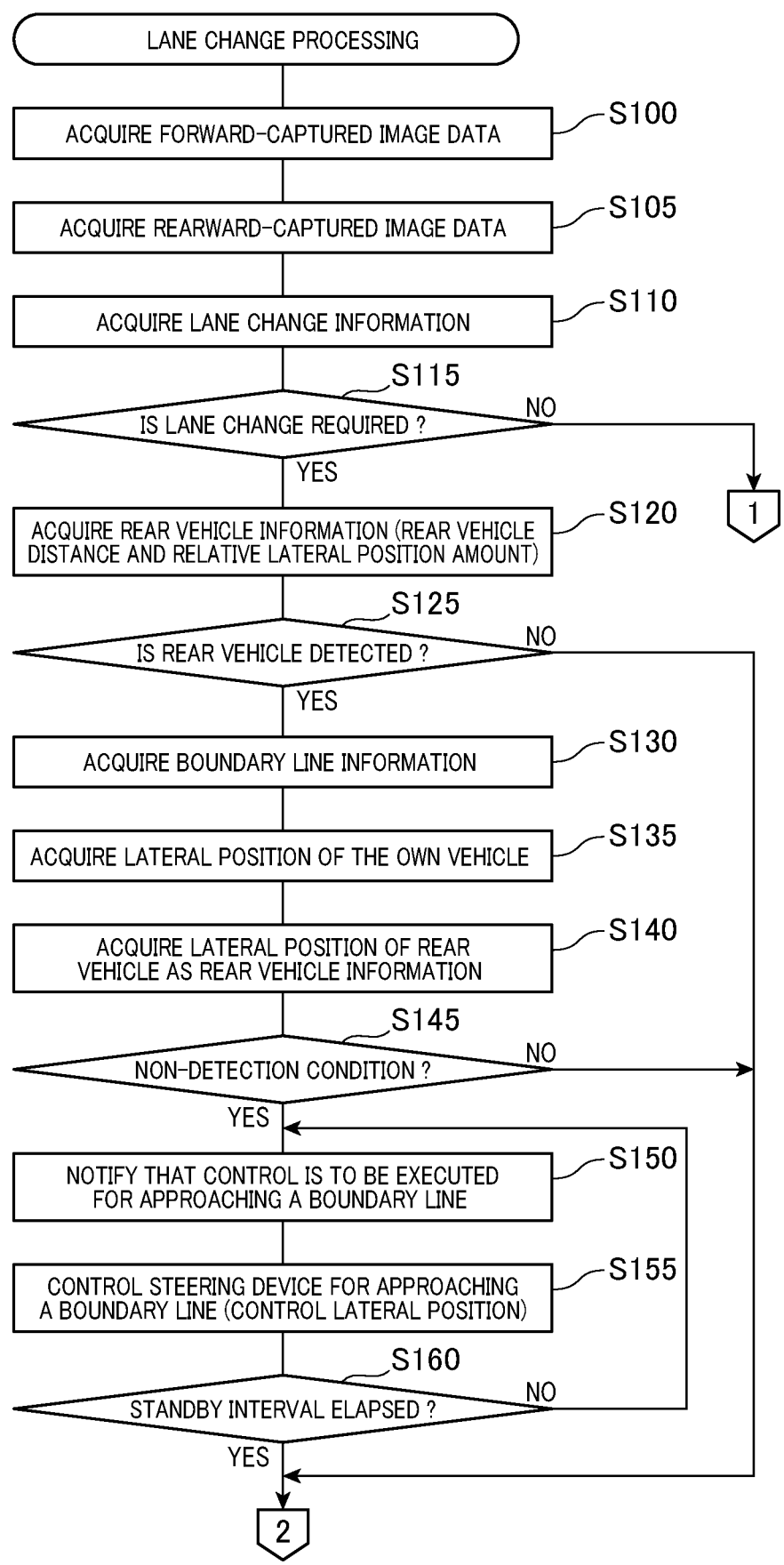
FIG. 2 is a flowchart (1/2) showing an example of lane change processing.

As shown in FIG. 2, the control unit 30 (CPU 31) obtains the forward-captured image data from the forward detection section 11, and stores the data in the image memory 34 (S100).

Then, the control unit 30 obtains the rearward-captured image data from the rearward detection section 12, and stores the data in the image memory 34 (S105).

Next, the control unit 30 obtains the lane change information of the own vehicle 101 from the lane-change information output section 13 (step S110).

Next, based on the lane change information obtained at step S110, the control unit 30 determines whether the own vehicle 101 is required to make a lane change (S115). Specifically, the control unit 30 determines that it is necessary to make a lane change when a signal indicating an operation performed by the driver is outputted from the right- or left-side direction indicator of the lane-change information output section 13, as lane change information.

When a signal indicating that no operation is performed by the driver is not outputted from the right- or left-side direction indicator, as lane change information, it is determined that a lane change is not required. When it is thus determined that no lane change is required for the own vehicle 101 (NO at S115), this lane change processing is ended. If it is determined that a lane change is required for the own vehicle 101 (YES at S115), the processing proceeds to step S120.

If it is determined at step S115 that a lane change is required, the control unit 30 obtains rear vehicle information relating to the rear vehicle 102, and stores this information in the RAM 33 (S120). The rear vehicle information is the information relating to the travel condition of the rear vehicle 102, including, for example, the presence or absence of the rear vehicle 102, and the relative distance (referred to in the following simply as "distance"), the relative speed and the relative lateral position amount, described hereinafter, between the rear vehicle 102 and the own vehicle 101. In this step, the control unit 30 performs the following types of processing. Specifically, the control unit 30 executes image recognition processing based on the rearward-captured image data obtained by the determination processing of step S105. In this way, the control unit 30 obtains rear vehicle information that indicates the presence or absence of the rear vehicle 102. If the rear vehicle 102 is present, the control unit 30 obtains, as rear vehicle information, the information that expresses a distance $x_2$ from the own vehicle 101 to the rear vehicle 102, and the information that expresses the relative lateral position amount between the own vehicle 101 and the rear vehicle 102. The relative lateral position amount is the amount of deviation (lateral-direction position deviation amount) in the position of the rear vehicle 102 with respect to the own vehicle 101, as measured along the width direction of the road 200, which is a direction (lateral direction) at right angle to the boundary line 92 (longitudinal direction that is the traveling direction).

As shown in FIG. 4, with the present embodiment, the position of the own vehicle 101 is taken to be the position of the rearward detection section 12 of the own vehicle 101 when vertically projected onto a horizontal plane that includes the boundary line 92 of the road 200. Furthermore, the position of the rear vehicle 102 is taken to be the position of the front right end part of the rear vehicle 102 when projected onto a horizontal plane that includes the boundary line 92 of the road 200.

Next, the control unit 30 determines whether the rear vehicle 102 has been detected (S125). In this step, the control unit 30 performs the following types of processing. Specifically, the control unit 30 determines whether the rear vehicle 102 has been detected based on the information indicating the presence or absence of the rear vehicle 102, that is, a part of the rear vehicle information that has been obtained at step S120. If it is determined that the rear vehicle 102 has been detected (YES at S125), the processing proceeds to step S130. If it is determined that no rear vehicle 102 has been detected (NO at S125), the processing proceeds to step S165, shown in FIG. 3.

If the control unit 30 determines detection (presence) of the rear vehicle 102 as a result of the determination at step S125, the boundary line information relating to the boundary line 92 is obtained (S130). The boundary line information expresses the position of the boundary line 92, which is the line that defines the own vehicle lane 201 and the adjacent lane 202 that is adjacent to the own vehicle lane 201.

As described above, the present embodiment is based on the assumption that the road 200 has two lanes in each direction. In the case in which the road 200 has three or more lanes in each direction, the lane that is the destination of a lane change can be specified based on the lane change information that is obtained through the determination at step S115. Specifically, the lane that is indicated by a direction indicator is taken to be a destination lane. The control unit 30 can then perform the subsequent processing, taking the lane that is the destination of the lane change as being the adjacent lane 202, and taking the line defining adjacent lane 202 and the own vehicle lane 201 as being the boundary line 92.

The position of the boundary line 92 contained in the boundary line information can be expressed by a distance from a predetermined reference or by relative coordinates, or can be expressed by absolute coordinates. With the present embodiment, the boundary line information is stored beforehand in the ROM 32. Furthermore, as shown in FIG. 4, the boundary line 92 contained in the stored boundary line information is expressed with the boundary center line 921, which is the center line of the boundary line 92, being the x-axis in a predetermined coordinate system.

Hence in the following description, it is assumed that the boundary line 92 is expressed by the coordinate system (xy 2-dimensional coordinates) shown in FIG. 4. That is, the x-axis direction in the diagram corresponds to the longitudinal direction of the boundary center line 921. Furthermore, the intersection between the boundary center line 921 (x-axis) and a vertical line that extends from the position of the own vehicle 101 to the boundary center line 921, in a horizontal plane that contains the boundary line 92, is taken to be the origin O. The y-axis direction, passing through the origin O in the diagram, corresponds to the width direction of the road 200, which is a direction at right angle to the boundary center line 921.

Next, the control unit 30 acquires a lateral position $y_0$ of the own vehicle 101 (S135). Specifically, the control unit 30 defines the lateral position $y_0$ of the own vehicle 101 based on the forward-captured image data obtained at step S100. The lateral position $y_0$ of the own vehicle 101 is the distance from the boundary center line 921 to the own vehicle 101, as measured along the width direction (y-axis direction) of the road 200, in a horizontal plane that contains the boundary line 92. For example, as shown in FIG. 4, the lateral position $y_0$ of the own vehicle 101 is expressed by the distance from the boundary center line 921 (origin O) to the position of the own vehicle 101.

Next, the control unit 30 obtains a lateral position $y_r$ of the rear vehicle 102, as rear vehicle information, and stores the information in the RAM 33 (S140). Specifically, the control unit 30 specifies the lateral position $y_r$ of the rear vehicle 102 based on the relative lateral position amount obtained at step S120 and the lateral position $y_0$ of the own vehicle 101 obtained at step S135. The lateral position $y_r$ of the rear vehicle 102 is the distance from the boundary center line 921 to the rear vehicle 102, as measured along the width direction (y-axis direction) of the road 200, in a horizontal plane that contains the boundary line 92.

Next, the control unit 30 determines whether the own vehicle 101 is in a non-detection condition, based on the rear vehicle information of the rear vehicle 102 and the boundary line information of the boundary line 92 (S145). The non-detection condition of the own vehicle 101 arises when a range $S_0$ enabling the rearward detection section 12 of the own vehicle 101 to perform detection (referred to below as the detection range) is obstructed by the rear vehicle 102. Specifically, this is a condition whereby, when the adjacent rearward vehicle 103 is to be detected by the rearward detection section 12, the adjacent rearward vehicle 103 fails to be detected from the position of the own vehicle 101.

As shown in FIG. 4, the present embodiment is based on the following assumption as an example of a detection failure. Specifically, it is assumed that, within a predetermined detection distance $x_1$ parallel to the boundary line 92 from the own vehicle 101 (referred to in the following as a rearward detection distance), there is an obstruction range $S_1$ where obstruction is caused by the rear vehicle 102, in the detection range $S_0$ of the rearward detection section 12. The rearward detection distance $x_1$ is an arbitrarily predetermined value. For example, the rearward detection distance $x_1$ may be a predetermined value which is determined based on a distance between the adjacent rearward vehicle 103 and the own vehicle 101 required to be detected so that the own vehicle 101 can safely perform a lane change to the adjacent lane 202.

The control unit 30 determines that the own vehicle 101 is in a non-detection condition when the following conditions [1] and [2] are satisfied for the rearward detection distance $x_1$:

[1] An end part p of an adjacent lane 202 side obstruction range $S_1$ is positioned within the adjacent lane 202, with reference to the boundary line 92.

[2] The distance $w_n$ from an end part q of the adjacent lane 202, on the opposite side from the boundary line 92, to the end part p of the obstruction range S (hereinafter referred to as a detectable width) is less than a predetermined threshold (hereinafter referred to as a determination reference value) $W_{th}$.

If both of the above conditions [1] and [2] are met, the control unit 30 determines that the own vehicle 101 is in a non-detection condition.

For example, it is assumed that the threshold $w_{th}$ is set to a value greater than the width of a generally used four wheeled vehicle, and the adjacent rearward vehicle 103 is a generally used four wheeled vehicle. In that case, when the detectable width $w_n$ is greater than or equal to the threshold $w_{th}$ ($w_n \geq w_{th}$), the adjacent rearward vehicle 103 can be detected by the rearward detection section 12. The reason why detection is possible is that the detectable width $w_n$ is within the detection range $S_0$ of the rearward detection section 12, and a width greater than or equal to the width of a four wheeled vehicle is secured as a detectable width.

The above description is given by way of an example of setting the threshold $w_{th}$ based on the width of a generally used four wheeled vehicle, however the disclosure is not limited to this. For example, the threshold $w_{th}$ could be set according to the detection performance of the rearward detection section 12, the vehicle type of the adjacent rearward vehicle 103, etc. In the case in which the adjacent rearward vehicle 103 is a two wheeled vehicle, the determination threshold $w_{th}$ is desirably set to a higher value than in the case in which the adjacent rearward vehicle 103 is a four wheeled vehicle. That is to say, the threshold $w_{th}$ is desirably set, for example, to a value that is similar to the lane width $w_1$ of the adjacent lane 202. The width of a two wheeled vehicle is less than that of a four wheeled vehicle, which indicates easy occurrence of detection failures by the rearward detection section 12. For that reason, the detection range $S_0$ of the rearward detection section 12 should be as wide as possible.

In this step, the control unit 30 performs the following types of processing. Specifically, the control unit 30 calculates a detection-impossible lateral position $y_n$, which is the lateral position of the adjacent lane 202 side end part p of the obstruction range $S_1$ (distance from the boundary center line 921 to the end part p) in the detection range $S_0$ of the rearward detection section 12, based on equation (1) below.

[Math. 1]

$$y_n = y_0 + \frac{(y_r - y_0)}{x_2} \times x_1 \tag{1}$$

As mentioned above, $y_0$ is the lateral position of the own vehicle 101, $y_r$ is the lateral position of the rear vehicle 102, $x_1$ is the rearward detection distance, and $x_2$ is the distance between the own vehicle 101 and the rear vehicle 102.

Next, the control unit 30 calculates a detectable width $w_n$ by subtracting the detection-impossible lateral position $y_n$ from the lane width $w_1$ of the adjacent lane 202, based on equation (2).

[Math. 2]

$$w_n = w_1 - y_n \tag{2}$$

If the detectable width $w_n$ is less than the threshold $w_{th}$ ($w_n < w_{th}$), the control unit 30 determines that the own vehicle 101 cannot reliably detect other vehicles. In other words, the own vehicle 101 is in a non-detection condition. When the result is that the own vehicle 101 is in a non-detection condition (YES at S145), processing proceeds to step S150. If it is determined that the own vehicle 101 is in a detectable condition (NO at S145), processing proceeds to step S165 shown in FIG. 3.

As opposed to the case shown in FIG. 4, it is considered that the rear vehicle 102 is following immediately behind the own vehicle 101, with no sufficient distance therebetween. Such a situation may lead to a situation in which, within the rearward detection distance $x_1$ from the own vehicle 101 parallel to the boundary line 92, the adjacent lane 202 side end part p of the obstruction range S1, as measured with the boundary line 92 as reference, is not positioned within the adjacent lane 202. That is to say, such a situation may lead to a situation in which, within the rearward detection distance $x_1$ from the own vehicle 101, the adjacent lane 202 side end part p of the obstruction range $S_1$ is positioned outside the own vehicle lane 201 and, also, outside the adjacent lane 202 (in a place crossing over the adjacent lane 202 as seen from the own vehicle lane 201). In such a situation, the control unit 30 determines that the own vehicle 101 is in a non-detection condition.

When it is determined at step S145 that the own vehicle 101 is in a non-detection condition, the control unit 30 notifies that the own vehicle 101 is to be controlled to approach the boundary line 92 (S150). That is to say, the control unit 30 notifies that the lateral position $y_0$ of the own vehicle 101 is changing. In this case, for example, the control unit 30 makes a notification accordingly to the occupant (driver) of the own vehicle 101 by using the loudspeaker 22 or the like. In this way, the driving support apparatus 1 controls the own vehicle 101 (performs S155 and the subsequent steps) for bringing the own vehicle 101 closer to the boundary line 92 than the center of the own vehicle lane 201 (reference position), without startling the occupant of the own vehicle 101.

The control unit 30 controls the steering device 21 so as to cause the own vehicle 101 to travel closer to the boundary line 92 than to the reference position (S155). Specifically, the control unit 30 outputs a command for controlling the steering device 21 to make the lateral position $y_0$ of the own vehicle 101 become close to zero. As a result, the own vehicle 101 travels along the boundary line 92.

Next, the control unit 30 determines whether the time elapsed from the commencement of control of the steering device 21 at step S155 (time elapsed from the output of the command for controlling the lateral position $y_0$) is a predetermined standby interval or more (S160). If it is determined as a result that the elapsed time is less than the standby interval (NO at S160), then the processing proceeds to step S150. If it is determined that the elapsed time is greater than the standby interval (YES at S160) the processing proceeds to step S165 shown in FIG. 3. That is to say, during the time until the standby interval has elapsed, the driving support apparatus 1 continues to control traveling of the own vehicle 101, while notifying that the control for bringing the own vehicle 101 closer to the boundary line 92 is performed. The standby interval is set to a value (for example, several seconds) that is greater than the time required for enabling the camera of the rearward detection section 12 to capture an image.

If it is determined at step S160 that the elapsed time is not less than the standby interval, the control unit 30 acquires adjacent information relating to the adjacent rearward vehicle 103 (S165). The adjacent information at least includes information that expresses presence or absence of the adjacent rearward vehicle 103. In this step, the control unit 30 performs the following types of processing. Specifically, the control unit 30 obtains the most recent rearward-captured image data from the rearward detection section 12, and stores the data in the image memory 34. Based on the stored rearward-captured image data, the control unit 30 executes image recognition processing. Based on the image recognition results, the control unit 30 detects whether there is the adjacent rearward vehicle 103, and stores the detection results as adjacent information in the RAM 33.

If the presence of the adjacent rearward vehicle 103 is detected, the control unit 30 detects the distance and relative speed between the adjacent rearward vehicle 103 and the own vehicle 101, based on the rearward-captured image data obtained in this step. The control unit 30 stores these detection results also in the RAM 33 as adjacent information.

Based on the adjacent information obtained at step S165, the control unit 30 determines whether the adjacent rearward vehicle 103 has been detected (S170). If it is determined that the adjacent rearward vehicle 103 has been detected (YES at S170), processing proceeds to step S175. If it is determined that no adjacent rearward vehicle 103 has been detected (NO at S170), processing proceeds to step S185.

If it is determined at step S170 that the adjacent rearward vehicle 103 has been detected (is present), the control unit 30 determines whether there is a danger of collision between the own vehicle 101 and the adjacent rearward vehicle 103 when lane is changed from the own vehicle lane 201 to the adjacent lane 202 (step S175). Specifically, the control unit 30 calculates TTC (time to collision) of the own vehicle 101 with respect to the adjacent rearward vehicle 103 traveling in the adjacent lane 202. Based on the calculated TTC, the control unit 30 determines whether there is a danger of collision between the own vehicle 101 and the adjacent rearward vehicle 103. TTC is a predicted time interval (collision predicted time interval) until the own vehicle 101 collides with an object. TTC is calculated by dividing the distance from the own vehicle 101 to the adjacent rearward vehicle 103 traveling in the adjacent lane 202, by the relative speed between the own vehicle 101 and the adjacent rearward vehicle 103.

The control unit 30 determines that there is a danger of collision in the case where TTC of the own vehicle 101 with respect to the adjacent rearward vehicle 103 is less than a collision reference value which is a predetermined value. Thus, if it is determined that there is a danger of collision between the own vehicle 101 and the adjacent rearward vehicle 103 when lane is changed from the own vehicle lane 201 to the adjacent lane 202 (YES at S175), processing proceeds to step S180. If it is determined that there is no danger of collision between the own vehicle 101 and the adjacent rearward vehicle 103 (NO at S175), processing proceeds to step S185.

If it is determined at step S175 that there is no danger of collision between the own vehicle 101 and the adjacent rearward vehicle 103, the control unit 30 determines whether there is a danger of collision between the own vehicle 101 and an adjacent forward vehicle when lane is changed from the own vehicle lane 201 to the adjacent lane 202 (S185). The adjacent forward vehicle (not shown) refers to a vehicle traveling in the adjacent lane 202 and is traveling ahead of the own vehicle 101. In this step, the control unit 30 performs the following types of processing. Specifically, the control unit 30 acquires the most recent forward-captured image data from the forward detection section 11 and stores the data in the image memory 34. Based on the stored forward-captured image data, the control unit 30 performs image recognition processing. Based on the image recognition processing results, the control unit 30 detects presence or absence of an adjacent forward vehicle. If an adjacent forward vehicle is detected, the control unit 30 calculates TTC of the own vehicle 101 with respect to the adjacent forward vehicle.

The control unit 30 determines that that there is a danger of collision in the case where TTC of the own vehicle 101 with respect to the adjacent forward vehicle is less than a collision reference value which is a predetermined value. Thus, if it is determined that there is a danger of collision between the own vehicle 101 and the adjacent forward vehicle when lane is changed from the own vehicle lane 201 to the adjacent lane 202 (YES at S185), then processing proceeds to step S180. If it is determined that there is no danger of collision between the own vehicle 101 and the adjacent forward vehicle (NO at S185), then processing proceeds to step S190.

If it is determined at step S175 or S185 that there is a danger of collision, the control unit 30 notifies that a lane change cannot be performed safely (S180). In this case, the control unit 30 notifies the occupant (driver) of the own vehicle 101 that this is not an appropriate time for executing a lane change, by using the loudspeaker 22 or the like. The control unit 30 then ends the lane change processing.

If it is determined at step S175 or S185 that there is no danger of collision, the control unit 30 controls the steering device 21 so as to cause the own vehicle 101 to perform a lane change (so that the own vehicle 101 travels in the adjacent lane 202) (S190). Specifically, the control unit 30 outputs a command for controlling the steering device 21 so as to bring the lateral position $y_0$ of the own vehicle 101 close to the center line of the adjacent lane 202. The control unit 30 then ends the lane change processing.

In this way, the own vehicle 101 performs a lane change, crossing over the boundary line 92 to travel along the center line of the adjacent lane 202.

[3. Advantageous Effects]

With the driving support apparatus 1 of the present embodiment, as described above, the following effects are obtained.

Figure 5:
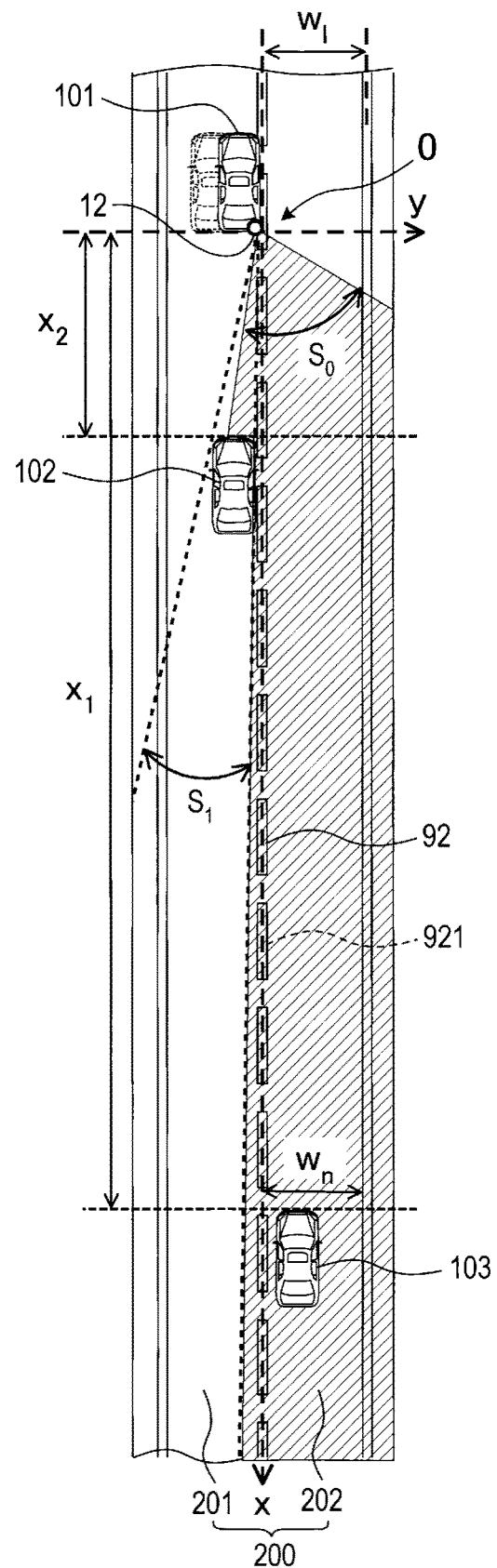
FIG. 5 is a diagram describing effects obtained when control of a steering device is performed (control of lateral position of the own vehicle).

[3A] As shown in FIG. 4, even if part of the detection range $S_0$ of the rearward detection section 12 is obstructed by the rear vehicle 102, the driving support apparatus 1 of the present embodiment causes the own vehicle 101 to travel close to the boundary line 92. Hence, as shown in FIG. 5, the obstruction range $S_1$ due to the rear vehicle 102 (the range obstructed by the rear vehicle 102) is reduced from the detection range $S_0$. Hence, when there is the rear vehicle 102 behind the own vehicle 101, the driving support apparatus 1 can prevent the rearward detection section 12 from failing detection of the adjacent rearward vehicle 103 positioned behind the rear vehicle 102, in an adjacent lane 202.

[3B] When a lane change is required (YES at S115), the driving support apparatus 1 of the present embodiment causes the own vehicle 101 to travel so as to approach the boundary line 92 (S155). When performing a lane change, it is important to detect the surrounding conditions behind the own vehicle 101. The driving support apparatus 1 can prevent the rearward detection section 12 from failing detection of the adjacent rearward vehicle 103, and thus the surrounding conditions behind the own vehicle 101 can be accurately detected. As a result, the driving support apparatus 1 can cause the own vehicle 101 to safely perform lane changes with high accuracy, based on detection results.

[3C] When a lane change is required (YES at S115), the driving support apparatus 1 of the present embodiment temporarily causes the own vehicle 101 to travel close to the boundary line 92 (S155). Thereafter, when a predetermined standby interval has elapsed (YES at S160), the driving support apparatus 1 obtains adjacent information from the rearward detection section 12, indicating whether there is the adjacent rearward vehicle 103. The driving support apparatus 1 prevents the rearward detection section 12 from failing detection in detecting the adjacent rearward vehicle 103, since the adjacent information is obtained in a condition where the obstruction range $S_1$ due to the rear vehicle 102 is reduced.

[3D] With the present embodiment, the non-detection condition of the own vehicle 101 is taken to be a condition in which the detection range $S_0$ of the rearward detection section 12 is obstructed by the rear vehicle 102 to possibly cause the rearward detection section 12 to fail detection of the adjacent rearward vehicle 103. The driving support apparatus 1 of the present embodiment determines whether the own vehicle 101 is in a non-detection condition, based on at least one of the boundary line information of the boundary line 92 and the rear vehicle information of the rear vehicle 102 (S145). The boundary line information of the boundary line 92 includes the distance $y_0$ from the own vehicle 101 to the boundary line 92 (the lateral position of the own vehicle 101). Hence, the driving support apparatus 1 determines whether the own vehicle 101 is in a non-detection condition, based on at least one of the distance $y_0$ from the own vehicle 101 to the boundary line 92 specified using the boundary line information, and the rear vehicle information of the rear vehicle 102.

Furthermore, when it is determined that there is the rear vehicle 102 based on the rear vehicle information, and the own vehicle 101 is in a non-detection condition (YES at S125, S145), the driving support apparatus 1 of the present embodiment causes the own vehicle 101 to approach and travel close to the boundary line 92, based on the boundary line information. With the driving support apparatus 1, as described above, even if the own vehicle 101 is in a non-detection condition (a condition where the rearward detection section 12 is likely to fail detection of the adjacent rearward vehicle 103), the rearward detection section 12 can be prevented from failing detection of the adjacent rearward vehicle 103.

[3E] The driving support apparatus 1 of the present embodiment determines whether the own vehicle 101 is in a non-detection condition within a rearward detection distance $x_1$ which is a predetermined detection distance extending rearward from the own vehicle 101. In this case, the driving support apparatus 1 determines that the own vehicle 101 is in a non-detection condition if both of the following conditions [1] and [2] are satisfied within a rearward detection distance $x_1$ (if satisfaction of both of the conditions [1] and [2] is detected).

[1] An end part p of an adjacent lane 202 side obstruction range $S_1$ is positioned within the adjacent lane 202, with reference to the boundary line 92.

[2] The distance (detectable width) $w_n$ from the end part q of the adjacent lane 202, at the opposite side of the boundary line 92, to the end part p of the obstruction range $S_1$ is less than a predetermined threshold (criterion) $w_{th}$.

In this way, the driving support apparatus 1 according to the present embodiment determines whether the own vehicle 101 is in a non-detection condition based on the lateral position $y_r$ of the rear vehicle 102, the distance $x_2$ from the own vehicle 101 to the rear vehicle 102, and the lateral position $y_n$ of the own vehicle 101.

[3F] The driving support apparatus 1 of the present embodiment notifies the occupant of the own vehicle 101 in advance that the own vehicle 101 will be controlled to approach the boundary line 92. The driving support apparatus 1 thereby controls the own vehicle 101 to approach the boundary line 92 without startling the occupant of the own vehicle 101.

With the present embodiment, the rearward detection section 12 in the detection unit 10 of the driving support apparatus 1 corresponds to an example of the processing section which serves as rearward vehicle detection means. Furthermore, the control unit 30 of the driving support apparatus 1 corresponds to an example of the processing section which serves as lane change information acquisition means, boundary line information acquisition means, rear vehicle information acquisition means, own vehicle boundary distance acquisition means, non-detection condition determination means, notification means, boundary travel control means, and detection control means. Specifically, step S110 executed by the control unit 30 corresponds to an example of the processing as the lane change information acquisition means, and step S130 corresponds to an example of the processing as the boundary line information acquisition means. Furthermore, steps S120 and S140 executed by the control unit 30 correspond to an example of the processing as the rear vehicle information acquisition means, and step S135 corresponds to an example of the processing as the own vehicle boundary distance acquisition means.

Furthermore, step S145 executed by the control unit 30 corresponds to an example of the processing as the non-detection condition determination means, and step S150 corresponds to an example of the processing as the notification means. Moreover, step S155 executed by the control unit 30 corresponds to an example of the processing as the boundary travel control means, and steps S165 and S170 correspond to an example of the processing as the detection control means.

[4. Other Embodiments]

An embodiment of a driving support apparatus of the present disclosure has been described above, however the technology of the present disclosure is not limited to the above embodiment, and may be implemented in various forms.

[4A] With the above embodiment, the control unit 30 determines that the own vehicle 101 is in a non-detection condition (S145) when the detectable width $w_n$ is less than the threshold $w_{th}$ ($w_n<w_{th}$). The meaning of the above equations (1) and (2) will be considered. The non-detection condition can be paraphrased as a Conditions 1 to 3 described in the following. Instead of determining the non-detection condition based on equations (1) and (2), the control unit 30 may determine that the own vehicle 101 is in a non-detection condition if any of the Conditions 1 to 3 is detected. However, it would be equally possible to determine that the own vehicle 101 is in a non-detection condition if a combination of the Conditions 1 to 3 is detected.

In the Condition 1, the rear vehicle 102 is traveling close to the boundary line 92. Specifically, as shown in FIG. 4, the Condition 1 expresses a condition that the distance $y_r$ between the rear vehicle 102 and the boundary line 92 (lateral position of the rear vehicle 102) is less than a first threshold A which is a predetermined value. The first threshold A can be any value as long as the value expresses a lateral position which indicates a condition where the rear vehicle 102 is traveling closer to the boundary line 92 than to the center of the lane.

In the Condition 2, the distance $x_2$ between the own vehicle 101 and the rear vehicle 102 is short to an extent that a part of the detection range $S_0$ of the rearward detection section 12 is obstructed by the rear vehicle 102 and that failures in detecting the adjacent rearward vehicle 103 will occur. Specifically, as shown in FIG. 4, in the Condition 2, the distance $x_2$ between the own vehicle 101 and the rear vehicle 102 is less than a second threshold B which is a predetermined value. The second threshold B may, for example, be any value as long as the value is smaller than the rearward detection distance $x_1$.

In the Condition 3, the own vehicle 101 is traveling closer to the side opposite to the boundary line 92 than to the center of the own vehicle lane 201 (reference position). Specifically, as shown in FIG. 4, in the Condition 3, the distance $y_0$ between the own vehicle 101 and the boundary line 92 (lateral position of the own vehicle 101) is greater than a third threshold C which is a predetermined value. The third threshold C can be any value as long as the value is greater than the first threshold A (C>A) and expresses a lateral position at an opposite side from the boundary line 92 (distance between the own vehicle 101 and an end part opposite to the boundary line 92).

[4B] With the above embodiment, the lane change information has been described as information inputted from the right- or left-side direction indicator operated by the driver, however the disclosure is not limited to information inputted by the driver. For example, the information indicating TTC with respect to a forward vehicle traveling ahead of the own vehicle in the own vehicle lane 201 may be used as the lane change information. In this case, the driving support apparatus 1 may be equipped with a camera for capturing images in the forward direction of the own vehicle, a laser radar device, a millimeter-wave radar device, or the like as a configuration for detecting TTC with respect to a forward vehicle.

In that case, the control unit 30 could be controlled so as to cause the own vehicle 101 to approach and travel close to the boundary line 92, if TTC expressed by the lane change information is less than a predetermined value that indicates a danger of collision between the own vehicle 101 and the forward vehicle.

[4C] The above embodiment has been described for a configuration in which the rearward detection section 12 is equipped with a camera, however the disclosure is not limited to this. The rearward detection section 12 can be equipped with a laser radar device, in place of a camera. Additionally, the rearward detection section 12 can be equipped with a laser radar device, a millimeter-wave radar device, or the like, together with a camera.

[4D] The above embodiment has been described for a configuration in which the rearward detection section 12 detects both the rear vehicle 102 and the adjacent rearward vehicle 103, however the disclosure is not limited to this. It would be sufficient for the rearward detection section 12 to be capable of detecting at least the adjacent rearward vehicle 103. In that case, the driving support apparatus 1 could be equipped with another camera, or a laser radar device, a millimeter-wave radar device, or the like, in a rear part of the own vehicle 101, for detecting the rear vehicle 102.

[4E] The functions of a single constituent element of the above embodiment may be dispersed into a plurality of constituent elements, or the functions of a plurality of constituent elements may be integrated into a single constituent element. Moreover, at least a part of the configuration of the above embodiment may be replaced by a known configuration having a similar function. Furthermore, a part of the configuration of the above embodiment may be omitted. Moreover, a part of the configuration of the above embodiment may be replaced or augmented with another part of the configuration of the above embodiment. The embodiment of a driving support apparatus according to the present disclosure corresponds to every aspect encompassed by the technical concepts (technical range) specified by the objectives of the present disclosure.

[4F] The functions provided by the driving support apparatus and driving support method of the present disclosure can be provided in the following form. Specifically, the functions can be provided in the form of a system including the driving support apparatus 1 as a constituent element. Furthermore, for example, the functions can be provided in the form of a program for functioning the control unit 30 of the driving support apparatus 1, a medium on which the program is recorded, or the like.

REFERENCE SIGNS LIST

1. Driving support apparatus,
10. Detection section,
12. Rearward detection section,
20. Driving support execution section,
30. Control section,
31. CPU.

The invention claimed is:
1. A driving support apparatus comprising:
rear vehicle information acquisition means for acquiring rear vehicle information including information relating to a presence or absence of a rear vehicle that is traveling behind an own vehicle, in an own vehicle lane, the own vehicle lane being a lane in which the own vehicle is traveling;
rearward vehicle detection means for detecting an adjacent rearward vehicle that is traveling behind the own vehicle, in an adjacent lane, the adjacent lane being a lane adjacent to the own vehicle lane;
boundary line information acquisition means for acquiring boundary line information expressing a position of a boundary line that divides the own vehicle lane and the adjacent lane;
boundary travel control means for controlling the own vehicle to approach and travel close to the boundary line, based on the boundary line information, in response to the rear vehicle being detected based on the rear vehicle information; and non-detection condition determination means for determining whether the own vehicle is in a non-detection condition, based on i) a distance from the own vehicle to the boundary line, as specified using the boundary line information, ii) a distance from the own vehicle to the boundary line, iii) a predetermined rearward detection distance, and iv) a distance between the own vehicle and the rear vehicle traveling in the own vehicle lane, the non-detection condition being a condition in which there is a risk of there being an undetected adjacent rearward vehicle by the rearward vehicle detection means, caused by obstruction of a detection range of the rearward vehicle detection means by the rear vehicle, wherein:

after approaching and traveling close to the boundary line and elapsing a predetermined standby interval, the rearward vehicle detection means detects the presence or absence of the adjacent rearward vehicle in the adjacent lane; and the predetermined standby interval is set to a value that is greater than a time required for enabling the rearward vehicle detection means to detect the adjacent rearward vehicle; and wherein:

in response to the rear vehicle being detected and the non-detection condition determination means determines that the own vehicle is in the non-detection condition, the boundary travel control means causes the own vehicle to approach and travel close to the boundary line for the predetermined standby interval; and within the predetermined rearward detection distance parallel to the boundary line is an obstruction range where obstruction is caused by the rear vehicle in the detection range of the rearward vehicle detection means.

2. The driving support apparatus according to claim 1, comprising lane change information acquisition means for acquiring lane change information that expresses whether the own vehicle is required to execute a lane change, wherein in response to the rear vehicle being detected and to determining that the own vehicle is required to execute a lane change, the boundary travel control means controls the own vehicle so as to approach and travel close to the boundary line between the adjacent lane and the own vehicle lane, based on the lane change information, the adjacent lane being a lane that is a lane change destination.

3. The driving support apparatus according to claim 2, comprising detection control means for causing the boundary travel control means to make the own vehicle approach the boundary line and cause the rearward vehicle detection means to detect the adjacent rearward vehicle, in response to determining that the own vehicle is required to execute a lane change.

4. The driving support apparatus according to claim 1, comprising non-detection condition determination means for determining whether the own vehicle is in a non-detection condition, based on at least one of the distance from the own vehicle to the boundary line, as specified using the boundary line information, and the rear vehicle information, the non-detection condition being a condition in which there is a risk of there being an undetected adjacent rearward vehicle by the rearward vehicle detection means, caused by obstruction of the detection range of the rearward vehicle detection means by the rear vehicle, wherein in response to the rear vehicle being detected and the non-detection condition determination means determines that the own vehicle is in the non-detection condition, the boundary travel control means causes the own vehicle to approach and travel close to the boundary line, based on the boundary line information.

5. The driving support apparatus according to claim 4, wherein:

the rear vehicle information acquisition means acquires information expressing the distance from the rear vehicle to the boundary line, as the rear vehicle information; and in response to the distance from the rear vehicle to the boundary line being less than a first predetermined threshold, the non-detection condition determination means determines that the own vehicle is in the non-detection condition, based on the rear vehicle information.

6. The driving support apparatus according to claim 4, wherein:

the rear vehicle information acquisition means acquires information expressing the distance from the own vehicle to the rear vehicle, as the rear vehicle information; and in response to the distance from the own vehicle to the rear vehicle being less than a second predetermined threshold, the non-detection condition determination means determines that the own vehicle is in the non-detection condition, based on the rear vehicle information.

7. The driving support apparatus according to claim 4, comprising own vehicle boundary distance acquisition means for acquiring the distance from the own vehicle to the boundary line, wherein:

in response to the distance from the own vehicle to the boundary line being greater or equal to a third predetermined threshold, the non-detection condition determination means determines that the own vehicle is in the non-detection condition.

8. The driving support apparatus according to claim 4, wherein:

the non-detection condition determination means determines that the own vehicle is in the non-detection condition based on the rear vehicle information and the boundary line information within a rearward detection distance that is a predetermined detection distance in a rearward direction from the own vehicle, using a range as an obstruction range obstructed by the rear vehicle in the detection range of the rearward vehicle detection means, and using the boundary line as a reference, the non-detection condition being determined to exist in response to an adjacent lane side end part of the obstruction range being positioned within the adjacent lane, and a distance from an end part opposite to the boundary line to the end part of the obstruction range in the adjacent lane being detected to be less than a predetermined threshold.

9. The driving support apparatus according to claim 1, comprising notification means for executing notification of performing control for causing the own vehicle to approach the boundary line, in response to the boundary travel control means controlling the own vehicle to approach the boundary line.

10. A driving support method executed by a driving support apparatus installed in a vehicle for detecting a view of an adjacent rearward vehicle, the adjacent rearward vehicle traveling behind and in an adjacent lane relative to an own vehicle such that a rearward view of the adjacent rearward vehicle from the own vehicle is obstructed by a rear vehicle traveling behind the own vehicle in the own vehicle lane, the own vehicle lane being a lane in which the own vehicle is traveling, the driving support method comprising:

acquiring information relating to a presence or absence of the rear vehicle that is traveling behind the own vehicle;

acquiring boundary line information that expresses a position of a boundary line which divides the own vehicle lane and the adjacent lane;

controlling the own vehicle to approach and travel close to the boundary line, based on the boundary line information, in response to the rear vehicle being detected;

detecting the adjacent rearward vehicle after the own vehicle is controlled to approach and travel close to the boundary line and elapsing a predetermined standby interval;

setting the predetermined standby interval to a value that is greater than a time required for enabling the detecting of the adjacent rearward vehicle, and determining whether the own vehicle is in a non-detection condition, based on i) a distance from the own vehicle to the boundary line, as specified using the boundary line information, ii) a distance from the own vehicle to the boundary line, iii) a predetermined rearward detection distance, and iv) a distance between the own vehicle and the rear vehicle traveling in the own vehicle lane, the non-detection condition being a condition in which there is a risk of there being an undetected adjacent rearward vehicle, caused by obstruction of a detection range by the rear vehicle, wherein:

in response to the rear vehicle being detected determining that the own vehicle is in the non-detection condition, the own vehicle is controlled to approach and travel close to the boundary line for the predetermined standby interval; and within the predetermined rearward detection distance parallel to the boundary line is an obstruction range where obstruction is caused by the rear vehicle in the detection range.

11. A driving support system comprising:
a non-transitory memory;
a processor in communication with the non-transitory memory, the processor being configured to:
acquire rear vehicle information including information relating to a presence or absence of a rear vehicle that is traveling behind an own vehicle, in an own vehicle lane, the own vehicle lane being a lane in which the own vehicle is traveling;

detect an adjacent rearward vehicle that is traveling behind the own vehicle, in an adjacent lane, the adjacent lane being a lane adjacent to the own vehicle lane;

acquire boundary line information expressing a position of a boundary line that divides the own vehicle lane and the adjacent lane;

control the own vehicle to approach and travel close to the boundary line, based on the boundary line information, in response to the rear vehicle being detected based on the rear vehicle information;

detect the presence or absence of the adjacent rearward vehicle in the adjacent lane after the own vehicle is controlled to approach and travel close to the boundary line and elapsing a predetermined standby interval;

set the predetermined standby interval to a value that is greater than a time required for enabling the detecting of the adjacent rearward vehicle; and determine whether the own vehicle is in a non-detection condition, based on i) a distance from the own vehicle to the boundary line, as specified using the boundary line information, ii) a distance from the own vehicle to the boundary line, iii) a predetermined rearward detection distance, and iv) a distance between the own vehicle and the rear vehicle traveling in the own vehicle lane, the non-detection condition being a condition in which there is a risk of there being an undetected adjacent rearward vehicle, caused by obstruction of a detection range by the rear vehicle, wherein:

in response to the rear vehicle being detected determining that the own vehicle is in the non-detection condition, the own vehicle is controlled to approach and travel close to the boundary line for the predetermined standby interval; and within the predetermined rearward detection distance parallel to the boundary line is an obstruction range where obstruction is caused by the rear vehicle in the detection range.

12. The driving support apparatus according to claim 1, wherein the predetermined rearward detection distance is a predetermined value which is determined based on a distance, parallel to the boundary line, between the adjacent rearward vehicle and the own vehicle required to be detected so that the own vehicle can safely perform a lane change to the adjacent lane.

13. The driving support apparatus according to claim 1, wherein the rearward vehicle detection means is configured to detect one of the adjacent rearward vehicle and an absence of the adjacent rearward vehicle.

* * * * *